United States Patent
Veld

[15] 3,657,105
[45] Apr. 18, 1972

[54] ELECTRODIALYSIS APPARATUS

[72] Inventor: Willem In'T Veld, Beverwijk, Netherlands

[73] Assignee: Werkspoor Water N.V., Amsterdam-Buitenveldert, Netherlands

[22] Filed: Nov. 2, 1970

[21] Appl. No.: 86,232

[52] U.S. Cl. ..................................204/301, 204/180 P
[51] Int. Cl. .........................................B01d 13/02
[58] Field of Search ..........................204/180 P, 301

[56] References Cited

UNITED STATES PATENTS

| | | | |
|---|---|---|---|
| 196,254 | 10/1877 | Schering | 204/301 X |
| 1,861,796 | 6/1932 | Hodges | 204/301 X |
| 2,777,811 | 1/1957 | McRae et al. | 204/301 X |
| 2,990,361 | 6/1961 | Solt | 204/301 |
| 3,219,567 | 11/1965 | Lacey | 204/301 X |
| 3,291,716 | 12/1966 | Cioffi | 204/301 |
| 3,335,079 | 8/1967 | Nellen | 204/301 |
| 3,488,276 | 1/1970 | Tarsey | 204/301 |

*Primary Examiner*—John H. Mack
*Assistant Examiner*—A. C. Prescott
*Attorney*—Watson, Cole, Grindle & Watson

[57] ABSTRACT

An electrodialysis apparatus with diluate and concentrate chambers, the one type being formed by a free fluid space, the other type by membrane bags hanging in said space.

2 Claims, 4 Drawing Figures

PATENTED APR 18 1972 3,657,105

INVENTOR

Willem In 't Veld

BY Watson, Cole, Grindle & Watson
ATTORNEY

ELECTRODIALYSIS APPARATUS

The invention relates to an electrodialysis apparatus comprising, between two electrodes, a series of diluate chambers and concentrate chambers, which are separated by membranes. Such an apparatus is known in the art. In this apparatus known in the art the cells comprising the diluate chambers and concentrate chambers and the supply channels and discharge channels to and from these chambers are housed in a press frame. By means of the pressure exerted by the frame the cells are sealed and the supply channels and discharge channels (consisting of holes in the membranes and packing parts) are created. The demineralization is carried out with a slight difference in pressure over the membranes in order to prevent transport of water through them. All chambers are filled with a separator, which basically determines the flow of the fluid past the membranes and keeps the membranes at a distance from each other. The latter measure serves to prevent the membranes from contacting each other, which would result in electric short-circuiting and damage of membranes. Other causes of damage of membranes may be among other things too slow a pressure build-up in one of the fluid chambers when the apparatus is put into operation or the flow of fluid through the diluate chambers or concentrate chambers suddenly stopping. So as to prevent these damages the difference in pressure over the membranes is controlled with a differential manometer and moreover attempts are made to keep this difference between the allowable limits, which is not always a simple task. The apparatus known in the art also requires much piping and inherently it demands much pumping energy. It is the object of the invention to overcome these drawbacks. The invention is characterized in that the chambers of the one type are formed by hanging frames, which are exclusively with their upper parts clamped against each other via seals. The frames have separators, in order to support the membranes mounted on either side of them. The frames at the said upper parts within the seals are provided with supply channels and discharge channels to and from the separator chambers between the membranes. The chambers of the other type are exclusively formed by the free space around the lower parts of the frames.

Saving in piping is effected since the free space, around the lower parts of the frames, acts as the chambers of the one type of the dialysis apparatus. Therefore these chambers are automatically parallel, the diluate, respectively the concentrate that is in this free space is flowing around the chambers of the other type. Owing to this the resistance becomes low as a result of which a reduced pumping energy will suffice. If as this free space is chosen an open trough and, for instance, the apparatus is placed transversely to the flow of fluid, then the flow of fluid through these chambers becomes very simple. Separators for these chambers may be dispensed with, if desired, at least they have a far less critical function, because the pressure on the membranes from the free space is substantially the statical pressure. Therefore, differential manometers can be replaced by ordinary manometers.

Now the invention will be further elucidated with reference to a drawing with four figures of an embodiment of the invention.

Figure 4:
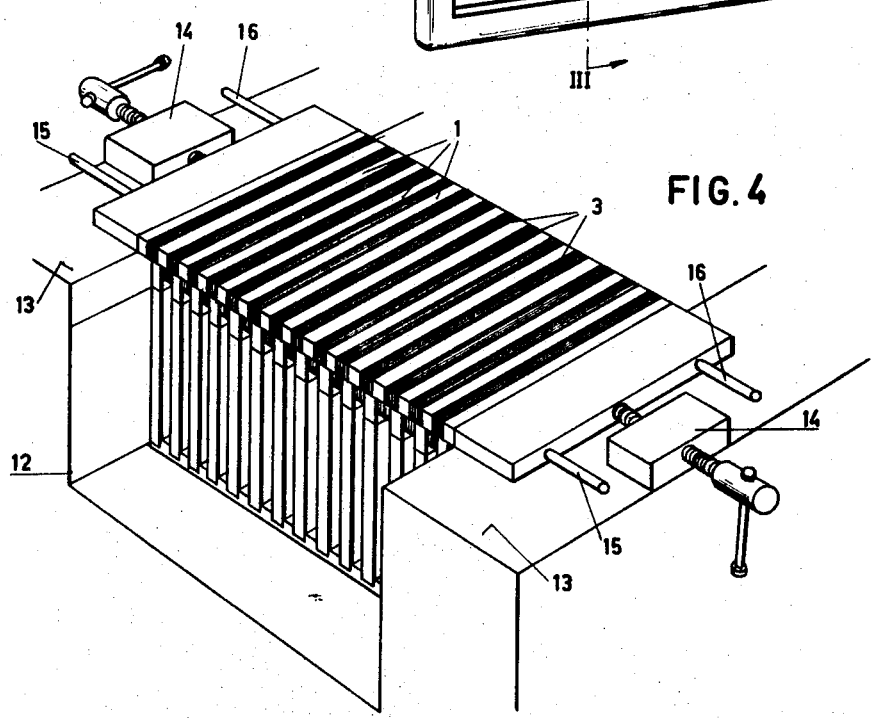

FIG. 4 schematically represents an embodiment of a dialysis apparatus according to the invention.

In the figures like numbers refer to like elements.

Figure 1:
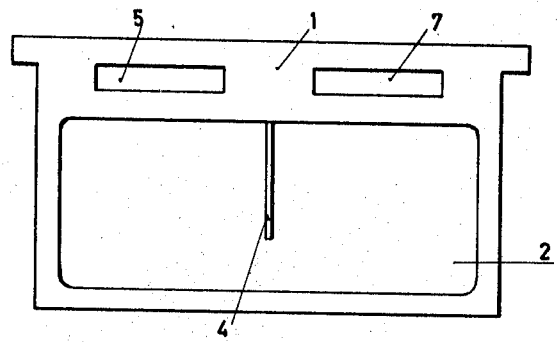
FIG. 1 represents an embodiment of a cell frame suitable for application in an apparatus according to the invention.
Figure 2:
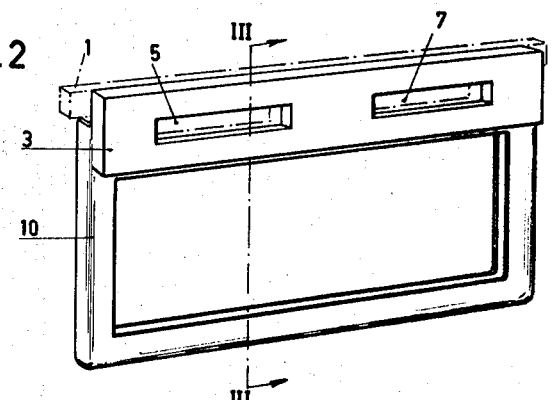
FIG. 2 represents a seal fitting around the cell frame that is shown in FIG. 1.
Figure 3:
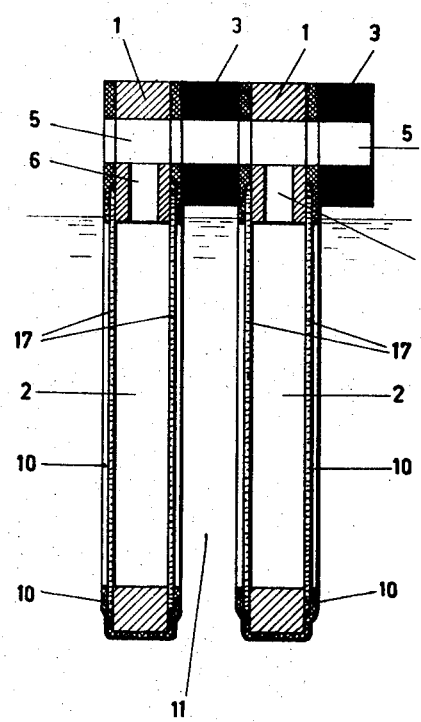
FIG. 3 represents a cross-section along line III—III in FIG. 2 over a cell packet.

Cell frame 1 shown in FIG. 1 is provided with a fluid chamber 2. A conductor 4 for the adequate flow of fluid through chamber 2, which may be filled with a separator (not drawn), divides the chamber into two halves. A supply channel 5 communicates with the left-hand half of chamber 2 through an opening 6. (FIG. 3) A discharge channel 7 communicates with the right-hand half of chamber 2 (FIG. 3) Seal 10 fitting around frame 1 clamps membranes 17 against frame 1. Seal 3 serves as a spacer for cell chambers 2. Then between cell chambers 2 a space 11 arises for the flow of fluid in transverse direction. This is shown in FIG. 4. Cell chambers 2 with seals 10 fit in a bottom in the shape of a battlement in trough 12. On the edges 13 of trough 12 a clamping device 14 is mounted, which presses cell packets 1 against each other with their parts 3 and seals them. Then connection 15 is connected to channel 5 and then connection 16 is connected to channel 7. Now the concentrate can be brought into cell chambers 2 via supply 15 and the diluate into trough 12 or vice versa. In the two uttermost cell chambers 2 the electrodes (not drawn) are mounted.

The cells will preferably be operated at a pressure lower than the atmospheric pressure. This can be achieved by sucking the fluid that flows through the cells by means of a pump instead of the press method normally used.

I claim:

1. An electrodialysis apparatus comprising a series of spaced, sealed chambers between two electrodes, said chambers comprising hanging frames with membranes mounted and sealed on each side, said chambers having their upper parts clamped together with separators providing a free space between the lower parts of said chambers allowing free-flowing liquid communication with the outside membrane faces of each chamber, said separators and the upper parts of said chambers being provided with supply and discharge channels therethrough, said channels being in fluid communication with the inside of each chamber.

2. An apparatus according to claim 3, further comprising seals, each seal consisting of an annular section, with openings, which fits tight around the upper part of a frame and a U-shaped section, which fits tight along the sides and the lower side of the lower part of that frame.

* * * * *